Aug. 14, 1945.　　　J. B. HAYES ET AL　　　2,382,480
CORN PICKER LIFTING MECHANISM
Filed July 25, 1941　　　2 Sheets-Sheet 1
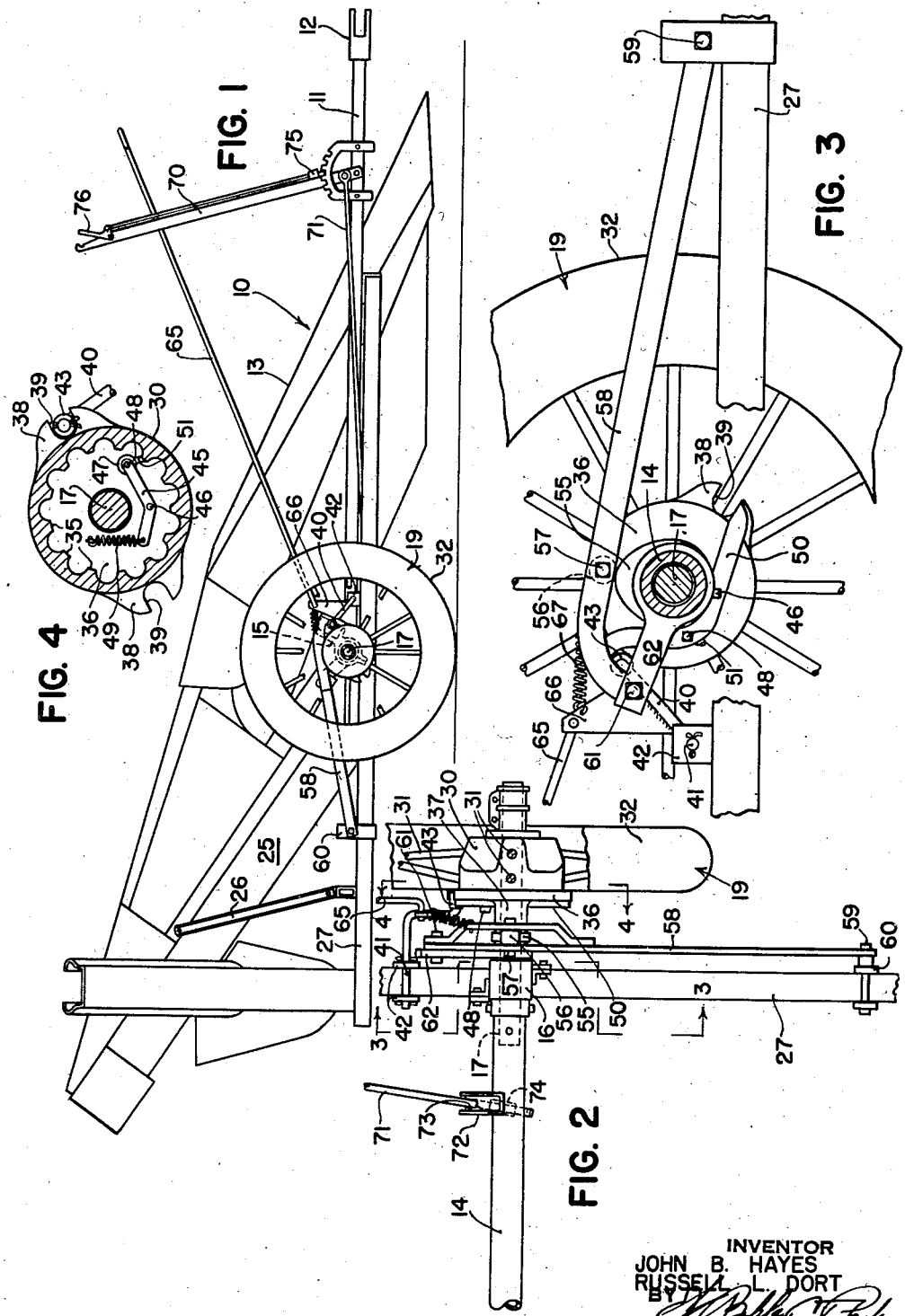
INVENTOR
JOHN B. HAYES
RUSSELL L. DORT
BY
ATTORNEY

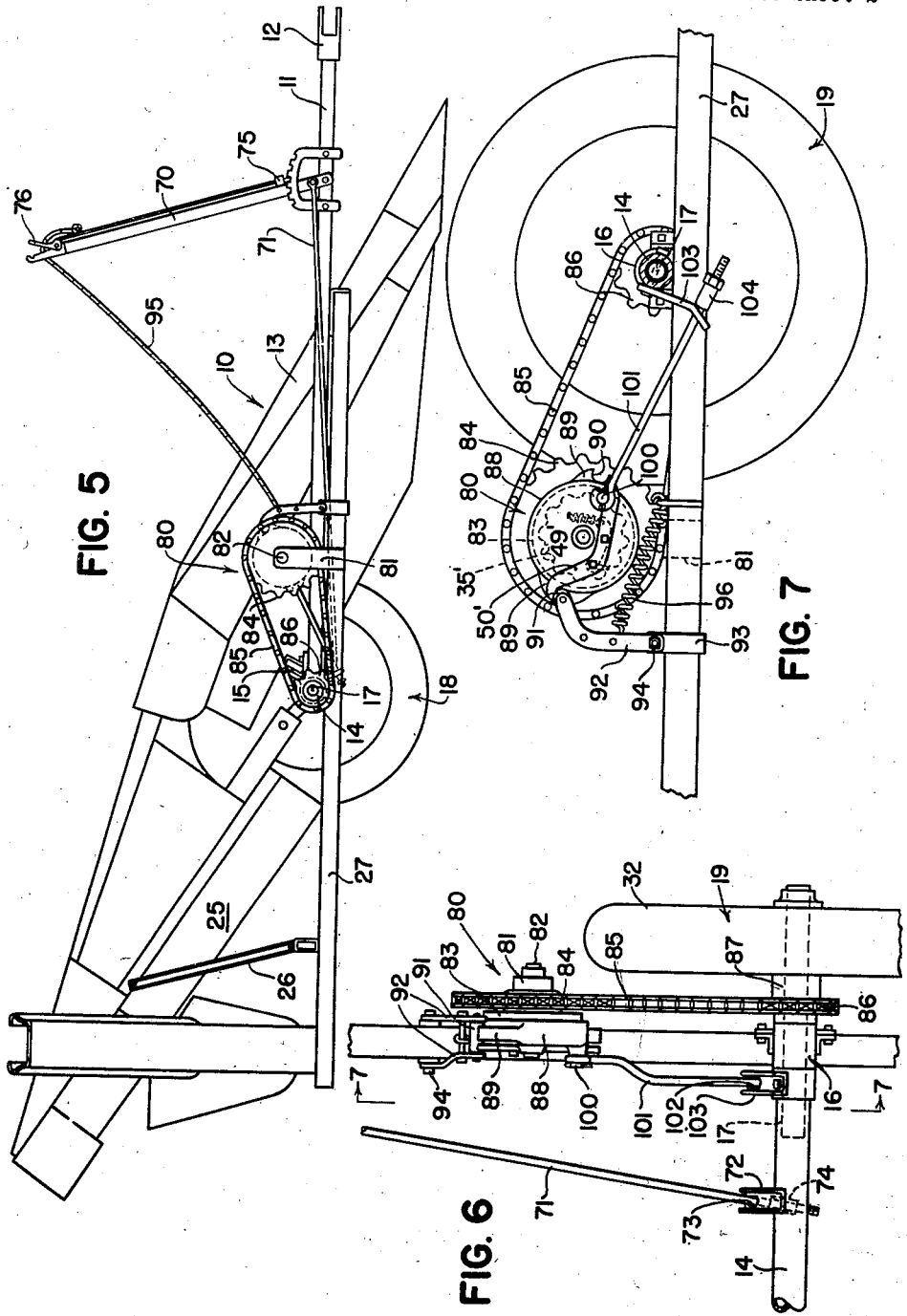

Patented Aug. 14, 1945

2,382,480

UNITED STATES PATENT OFFICE 2,382,480

CORN PICKER LIFTING MECHANISM

John B. Hayes, Milan, Ill., and Russell L. Dort, Davenport, Iowa, assignors to Deere & Company, Moline, Ill., a corporation of Illinois Application July 25, 1941, Serial No. 404,050

16 Claims. (Cl. 56—211)

The present invention relates generally to corn harvesters and more particularly to corn pickers of the type carried on, or towed behind a tractor or other draft device, and has for its principal object the provision of a power actuated lifting mechanism for raising the forward ends of the gatherers for transport purposes. A further object relates to the provision of a manually operable lever connected to adjust the clearance under the gatherers during operation and so arranged that manual adjustment by means of this lever does not affect the operation of the power lift mechanism.

A more specific object of this invention has to do with the provision of a self-interrupting clutch mechanism driven from one of the supporting wheels of the implement through a flexible endless power transmitting member such as a chain. Another specific object of this invention relates to the provision of a wheel actuated lifting mechanism mounted within the hub of the supporting wheel and connected through suitable lost motion connections to the gatherers, whereby the latter are raised to transport position from any position of adjustment.

These and other objects and advantages of this invention will be apparent to those skilled in the art after a consideration of the following description, in which reference is had to the drawings appended hereto, in which Figure 1 is a side elevational view of a corn harvester of the towed type embodying the principles of the present invention;

Figure 2 is a fragmentary plan view, drawn to an enlarged scale, showing the details of the lifting mechanism in the embodiment of Figure 1;

Figure 3 is a fragmentary sectional elevational view taken along a line 3—3 in Figure 2 and drawn to an even further enlarged scale;

Figure 4 is a sectional elevational view of the clutch mechanism, taken along a line 4—4 in Figure 2 and drawn to the scale of Figure 3;

Figure 5 is a side elevational view of a modified corn harvester and lifting mechanism embodying the principles of the present invention;

Figure 6 is a fragmentary plan view of the lifting mechanism shown in the embodiment of Figure 5; and Figure 7 is a side elevational view taken in section along a line 7—7 in Figure 6.

Referring now to the drawings and more particularly to Figures 1-4, inclusive, the implement, indicated in its entirety by the reference numeral 10, is a corn harvester and comprises a generally horizontally disposed draft frame 11 extending longitudinally and having a suitable hitch device 12, such as a clevis, on the forward end thereof for the purpose of connecting the implement to a tractor or other draft device (not shown). The implement is provided with conventional gatherers 13, which are fixed to and supported on a transversely disposed axle 14 in the form of a hollow pipe to which suitable brackets 15 are rigidly connected for supporting the gatherers 13. The axle 14 is journaled in bearings 16 at laterally opposite sides of the draft frame 11, providing for rotation of the axle 14 about its major axis relative to the frame 11. A stub axle 17 extends outwardly from either end of the pipe axle 14 and is rigidly fixed to the latter for supporting a pair of laterally spaced supporting wheels 18, 19, journaled on the stub axles 17, respectively.

A husking box 25 containing suitable husking mechanism, is journaled at its forward end on the axle 14 and supported at its rearward end on a brace 26 carried on a rearward extension 27 of the draft frame 11. Thus, it is evident that when the axle 14 is shifted angularly in a counterclockwise direction, as viewed in Figure 1, the gatherers 13 are raised about the transverse axis of the axle 14.

The wheel 19 comprises a hub 30 journaled on the stub axle 17, and a plurality of spokes 31 fixed to the hub 30. The outer ends of the spokes are fixed to the wheel rim, on which is mounted a conventional pneumatic rubber tire 32. The hub 30 is hollow adjacent its inner side and is provided with a plurality of radially inwardly extending teeth 35 spaced circumferentially around the inside of the hub. The open end of the hub adjacent the teeth is covered by a closure plate 36, which is mounted on its own hub 37, formed integrally therewith and journaled on the stub axle 17. The plate 36 is in the form of a disk of substantially the same outside diameter as the hub 30 except for a pair of diametrically oppositely extending ears 38, each of which is provided with a notch 39. The plate 36 and hub 37 thus constitute the normally stationary clutch member of a self-interrupting clutch mechanism of well-known design and operation.

The plate 36 is normally held against rotation by means of a detent arm 40 or crank having a bearing portion 41 journaled in a bearing support 42, which is fixed to the hitch frame member 11.

A detent roller 43 is journaled on the end of the crank arm 40 and is adapted to be received by either of the notches 39 to hold the plate 36 against rotation relative to the stub axle 17.

On the inside of the plate 36 is pivoted a clutch dog 45 on a pivot bolt 46. One end of the dog 45 carries a clutch roller 47 journaled on a pin 48 and the opposite end of the dog 45 beyond the pivot bolt 46 is connected to a spring 49, which is anchored to the plate 36. The spring 49 urges the clutch roller 47 into engagement with the teeth 35, and when it is in such engagement, power is transmitted from the normally rotating hub 30 through the roller 47, dog 45 and pivot bolt 46 to the plate 36 to rotate the latter therewith. The dog 45 is controlled by an actuating arm 50 pivotally mounted on the outer side of the plate 36 by means of the pivot bolt 46. The actuating arm 50 is also connected to the pin 48 which extends through a slot 51 in the plate 36. The opposite ends of the arm 50 are disposed adjacent the slots or notches 39, respectively, and are adapted to be engaged by the detent roller 43 when the latter drops into either of the notches 39. In this position the clutch roller 47 is out of engagement with the teeth 35, but when the arm 40 is swung to disengage the detent roller 43 from the notch 39, the spring 49 forces the clutch roller 47 into engagement with one of the teeth 35, in a manner well-known to those skilled in the art.

A camming member 55 in the form of an eccentric disc is rigidly fixed to the inner end of the hub 37 and is disposed in engagement with a roller 56 journaled on a bolt 57, which is carried on a lifting arm 58. The lifting arm 58 is pivotally mounted by means of a bolt 59 on a bracket 60, rigidly fixed to the rear extension 27 of the hitch frame 11, providing for vertical swinging movement of the arm 58 as the roller 56 rides over the camming disc 55. The forward end of the lifting arm 58 is pivotally connected by a bolt 61 to an arm 62 fixed rigidly to the outer end of the axle 14.

The mechanism is shown in the drawings in the raised position, in which the forward ends of the gatherers 13 are raised above the ground in transport position, the roller 56 being in engagement with the high point of the cam 55. To lower the gatherers 13, the arm 40 is swung forwardly by means of a control rod 65 swingably connected to a plate 66, which is welded to the arm 40. A forward pull on the control rod 65 disengages the roller 43 from the notch 39, allowing the dog 45 to swing the roller 47 into engagement with the teeth 35 and causing the clutch mechanism to rotate the cam 55, which lowers the lifting arm 58 and allows the arm 62 and axle 14 to swing in a counterclockwise direction, as viewed in Figure 3, to lower the gatherers 13. The cam 55 and plate 36 always rotates one-half a revolution, until the detent roller 43 drops into the opposite notch 39, stopping the movement of the normally stationary plate member 36. A second pull on the control rod 65 disengages the roller 43 and allows a second half-revolution of the plate 36, bringing the cam 55 back to the position shown in the drawings. The roller 43 is urged against the plate 36 by a spring 67 connected between the plate 66 and the lifting arm 58.

A manually operable adjusting lever 70 is pivotally mounted on the forward end of the hitch frame member 11 and is connected by a rearwardly extending rod 71 with the axle 14 through an arm 72. The arm 72 is rigidly bolted to the axle 14 and extends downwardly therefrom and is provided with an aperture 73 through which the rod 71 extends. A stop member 74 in the form of a nut is threaded on the rear end of the rod 71 and engages the back of the arm 72 to limit the extent of downward swinging movement of the gatherers 13, in order to hold the latter at any desired distance above the ground. The lever 70 is held in adjusted position by means of a latch 75, controlled by a hand lever 76 mounted on the handle of the lever 70 in the usual manner.

Thus it is evident that both the power lift mechanism and the manually adjustable lever 70 are connected to the axle 14 by lost motion connections, so that operation of either the mechanism or the lever can be accomplished independent of the other. When the lever 70 is set to limit the downward movement of the gatherers 13 to a certain height above the ground, the arm 72 swings down against the stop 74 during lowering movement of the clutch mechanism, and then the completion of the movement of the clutch mechanism merely acts to swing the cam 55 downwardly away from the roller 56, but regardless of the manual setting of the lever 70, the cam 55 can always swing up into engagement with the roller 56 to lift the gatherers to transport position. Furthermore, when the axle is angularly shifted to raise the gatherers from any position of operation, the arm 72 merely slides relative to the rod 71 away from the stop 74.

Referring now to the embodiment shown in Figures 5, 6 and 7, the self-interrupting clutch mechanism, indicated in its entirety by reference numeral 80, is not formed integrally with the hub of the wheel 19, but is mounted ahead of the axle and the hitch frame member 11 on a bracket 81. In this embodiment, the clutch mechanism 80 comprises a shaft 82 supported on the bracket 81, on which the normally rotating clutch member 83 is journaled. The member 83 is driven by a sprocket 84, mounted thereon, over which a flexible endless power transmitting member 85 in the form of a chain is trained. The chain 85 is also trained over a sprocket 86 fixed to the hub 87 of the wheel 19, and thus is driven continuously during forward movement of the implement. The inner side of the rotating member 83 is provided with clutch teeth 35' which are engaged by the usual clutch dog as in the first embodiment. The clutch dog is mounted on a normally stationary clutch member 88 in the form of a housing casting having radially outwardly extending ears 89 provided with the usual notches 90. The clutch dog actuating arm 50' is actuated by the detent roller 91, which is supported between a pair of arms 92 pivoted to a bracket 93 on the hitch frame member 11 by means of a bolt 94. The arm 92 is controlled by a rope 95, the forward end of which is supported on the handle of the lever 70 and the arm 92 is urged into holding engagement by means of a spring 96.

The normally stationary member 88 of the clutch mechanism 80 is provided with a crank pin 100, formed integrally therewith, to which is connected a rod 101 extending rearwardly through an aperture 102 in an arm 103, which is rigidly fixed to the axle 14. A stop member 104 in the form of a nut is screwed onto the rear end of the rod 101 which is threaded for this purpose. The nut 104 serves as a stop which engages the back of the arm 103 to provide a lost motion connection therewith for the purposes explained in connection with the first embodiment,

We claim:

1. An agricultural implement comprising a transversely disposed axle, supporting wheels journaled thereon, a body member rigidly fixed to said axle and shiftable angularly therewith about the major axis of the axle, a hitch member swingably connected with said axle by means providing for relative movement about said axis, an arm rigidly fixed to said axle, power lift means driven by one of said wheels and connected between said hitch member and said arm to angularly shift said axle and said body member relative to said hitch member.

2. In a corn harvester comprising a frame including a forwardly extending draft portion, a transverse wheel supported axle journaled thereon and gatherers fixed to said axle and shiftable angularly therewith relative to said frame to raise said gatherers, an arm fixed to said axle, a power lift mechanism, and means connecting said mechanism between said frame and said arm on said axle for optionally rotating the latter through a part of a revolution to raise said gatherers.

3. In a corn harvester comprising a frame including a forwardly extending draft portion, a transverse wheel supported axle journaled thereon and gatherers fixed to said axle and shiftable angularly therewith relative to said frame to raise said gatherers, arm means fixed to said axle, a power lift mechanism and a manually adjustable mechanism mounted on said frame, and lost motion means connecting each of said power lift mechanism and said manually adjustable mechanism with said arm means on said axle providing for shifting the latter angularly by either of said mechanisms, independent of each other.

4. In a corn harvester comprising a frame, a transverse wheel supported axle journaled thereon, gatherers fixed to said axle and shiftable angularly therewith relative to said frame to raise said gatherers, a pair of arms fixed to said axle and having apertures therein, a pair of rods extending through said apertures, a power lift mechanism connected to one of said rods, a manually adjustable lever connected to the other of said rods, and a stop on each of said rods engageable with the respective arm when each rod is moved in one direction.

5. In a corn harvester comprising a frame including a forwardly extending draft portion, a transverse axle journaled thereon, gatherers fixed to said axle and shiftable angularly therewith relative to said frame to raise said gatherers, a supporting wheel journaled on said axle, a pair of lever arms rigidly fixed to said axle, a self-interrupting lift mechanism including a normally rotating part driven by said wheel and a normally stationary part optionally driven by said wheel driven part, lost motion means for connecting said normally stationary part with one of said lever arms to shift the axle angularly to raise said gatherers, a manually adjustable lever on said frame, and lost motion means connecting said lever with said other lever arm to limit the return movement of said axle to hold the gatherers at a predetermined lower limit.

6. In a corn harvester comprising a frame, a transverse axle journaled thereon, gatherers fixed to said axle and shiftable angularly therewith relative to said frame to raise said gatherers, a supporting wheel journaled on said axle, a self-interrupting clutch mechanism journaled on said frame and including a normally rotating part, flexible endless power transmitting means connecting said part with said wheel to be driven thereby, a normally stationary part optionally driven by said rotating part, a crank on said stationary part, an arm fixed on said axle and having an aperture, a rod connected with said crank and extending through said aperture, and a stop on said rod on the opposite side of said arm.

7. In a corn harvester comprising a frame, a transverse axle journaled thereon, gatherers fixed to said axle and shiftable angularly therewith relative to said frame to raise said gatherers, a supporting wheel journaled on said axle and having a hub, a self-interrupting clutch mechanism disposed within said hub and driven by said wheel, and means operatively connecting said mechanism with said axle for optionally shifting the latter angularly to raise said gatherers.

8. In a corn harvester comprising a frame, a transverse axle journaled thereon, gatherers fixed to said axle and shiftable angularly therewith relative to said frame to raise said gatherers, a supporting wheel journaled on said axle and having a hub, a self-interrupting clutch mechanism disposed within said hub and driven by said wheel, lost motion means operatively connecting said mechanism with said axle for optionally shifting the latter angularly to raise said gatherers, a manually controlled lever mounted on said frame, and lost motion means connecting said lever with said axle to limit the return movement of the latter when the gatherers are lowered.

9. In a corn harvester comprising a frame, a transverse axle journaled thereon, gatherers fixed to said axle and shiftable angularly therewith relative to said frame to raise said gatherers, a supporting wheel journaled on said axle and having a hub, a self-interrupting clutch mechanism disposed within said hub and including a camming member journaled on said axle and optionally driven thereby, and a lifting member mounted on said frame and connected with said axle, said lifting member being normally disposed in engagement with said camming member for transmitting power from the latter to shift said axle angularly to lift said gatherers.

10. In a corn harvester comprising a frame, a transverse axle journaled thereon, gatherers fixed to said axle and shiftable angularly therewith relative to said frame to raise said gatherers, a supporting wheel journaled on said axle and having a hub, a plurality of radially extending teeth disposed within said hub, a clutch member journaled on said axle adjacent said hub, a dog pivotally mounted on said clutch member and engageable with said teeth, control means for controlling said dog and holding said member against rotation, and lost motion means connecting said clutch member with said axle to rotate the latter.

11. In a corn harvester comprising a frame, a transverse axle journaled thereon, gatherers fixed to said axle and shiftable angularly therewith relative to said frame to raise said gatherers, a supporting wheel journaled on said axle and having a hub provided with an open side, a plurality of radially extending teeth spaced circumferentially around the inside of said hub, a closure plate over said open side and journaled on said axle, a clutch dog pivoted on said plate and engageable with said teeth, control means for controlling said dog and holding said member against rotation, and lost motion means connecting said closure plate with said axle to rotate the latter.

12. In a corn harvester comprising a frame, a transverse axle journaled thereon, gatherers fixed to said axle and shiftable angularly therewith relative to said frame to raise said gatherers, a supporting wheel journaled on said axle and having a hub provided with an open side, a plurality of radially extending teeth spaced circumferentially around the inside of said hub, a closure plate over said open side and journaled on said axle, a clutch dog pivoted on said plate and engageable with said teeth, a camming member attached to said plate and driven thereby, a lifting member engageable with said camming member and pivotally mounted on said frame, means connecting said lifting member with said axle to transmit power from said cam when the latter is rotated by said closure plate, and control means for controlling said dog and normally holding said plate member against rotation.

13. In a corn harvester comprising a frame, a transverse axle journaled thereon and gatherers fixed to said axle and shiftable angularly therewith to raise said gatherers, lever arm means fixed to said axle, a self-interrupting lift mechanism connected with a suitable source of power and having an actuating member optionally operated between fixed limits, lost motion means connecting said mechanism between said frame and said lever arm means to swing said axle over a fixed range corresponding to the fixed limits of said mechanism when raising said gatherers but permitting the lowering movement of the latter to be interrupted at any point within said range without affecting the movement of said lifting mechanism, and manually adjustable stop means engageable with said lever arm means for interrupting said lowering movement of the gatherers at selected points within said range.

14. In a corn harvester comprising a frame, a transverse axle journaled thereon and gatherers fixed to said axle and shiftable angularly therewith to raise said gatherers, a self-interrupting lift mechanism connected with a suitable source of power and having a normally rotating part, a rotatable actuating member, control means for optionally connecting said member to said part for rotation through a predetermined number of degrees of angular movement, means for disconnecting said member at the end of said angular movement, and disengageable means for locking said actuating member at its disconnected position, a manually adjustable lever mounted on said frame and having a lost motion connection with said gatherers serving as a stop to arrest downward movement of the latter but permitting upward movement thereof, and a lost motion connection between said actuating member and said gatherers providing for lifting the latter by rotation of said member but permitting interruption of the downward movement of said gatherers by said lever connection without affecting the movement of said actuating member.

15. In a corn harvester comprising a frame, a transverse axle journaled thereon and gatherers fixed to said axle and shiftable angularly therewith to raise said gatherers, a self-interrupting lift mechanism connected with a suitable source of power and having a normally rotating part, a rotatable actuating member, control means for optionally connecting said member to said part for rotation through a predetermined number of degrees of angular movement, means for disconnecting said member at the end of said angular movement, and disengageable means for locking said actuating member at its disconnected position, a crank on said actuating member, an arm fixed to said axle and having an aperture, a rod connected to said crank and extending through said aperture, a stop on said rod on the opposite side of said arm, and adjustable stop means for arresting downward movement of said gatherers at selected points within the range of movement of the latter.

16. The combination set forth in claim 1, including the further provisions that said power lift means comprises a normally rotating part rotatably supported on said hitch member, flexible endless power transmitting means connecting said part with one of said wheels to be driven by the latter, a normally stationary part optionally driven by said rotating part, and a connection between said stationary part and said arm.

JOHN B. HAYES.
RUSSELL L. DORT.